United States Patent Office 3,355,415
Patented Nov. 28, 1967

3,355,415
NEW POLYMERIC MATERIALS
Roy Worrall, Newport, England, assignor to Monsanto Chemicals Limited, London, England, a British company
No Drawing. Filed Dec. 26, 1962, Ser. No. 247,300
The portion of the term of the patent subsequent to Jan. 3, 1984, has been disclaimed
10 Claims. (Cl. 260—41)

This invention is a continuation-in-part of that claimed in copending application S.N. 246,355 filed Dec. 21, 1962, now Patent No. 3,296,225, and relates to new polymeric materials and to a process for their production.

In the field of polymer technology considerable effort is devoted to investigating ways of producing materials having improved properties or new applications. The materials include those useful in, for instance, the production of sheets and molded articles, as well as materials that can be employed as reinforcing resins in laminates, for example, in conjunction with fibrous fillers such as, e.g., glass.

In copending application S.N. 246,355 filed Dec. 21, 1962 are described a new family of functional polymers wherein the functionality takes the form of ethylenically unsaturated ester groups dependent from a polymeric backbone. Optionally, these functional polymers contain additional functionality in the form of hydroxyl groups and/or saturated acyloxy groups.

It is an object of this invention to provide a new series of polymeric materials derived from the functional polymers of copending application S.N. 246,355 filed Dec. 21, 1962.

Another object is the provision of a new series of polymeric materials comprising, in copolymerized form, the functional polymers of copending application S.N. 246,355 filed Dec. 21, 1962 and an ethylenically unsaturated monomer; together with a process for the manufacture thereof.

Another object is the provision of novel thermoplastic and/or thermosetting molding materials and of shaped molded articles prepared therefrom.

A further object is the provision of a novel laminating resin and of laminates made therefrom.

These and other objects are attained through the provision of polymeric materials comprising, in copolymerized form, (a) an ethylenically unsaturated monomer and (b) a functional polymer as taught in copending application S.N. 246,355 filed Dec. 21, 1962, the full disclosure of which is herein incorporated by reference.

The functional polymer that is employed as starting material in the present invention, to summarize the disclosure of copending application S.N. 246,355 filed Dec. 21, 1962, is accordingly one having the structure of a copolymer of an olefinic hydrocarbon with at least one comonomer, the functional copolymer containing substituent ethylenically unsaturated acyloxy groups

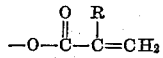

wherein R is either hydrogen or an alkyl group of from 1 to 4 carbon atoms.

Such a functional polymer is, for example, one having the structure of a copolymer of an olefinic hydrocarbon with an ester derived from an ethylenically unsaturated alcohol and an ethylenically unsaturated acid that is acrylic acid or an alpha-substituted acrylic acid, the portion of the ester that is copolymerized being the ethylenically unsaturated alcohol portion of the molecule, so that the acrylic acid portions are present in unpolymerized form as

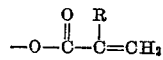

groups as defined above.

The new polymeric material of the present invention is therefore a polymerization product of an ethylenically unsaturated monomer with a functional polymer, the latter having the structure of a copolymer of an olefinic hydrocarbon with a comonomer, the copolymer containing substituent ethylenically unsaturated acyloxy groups

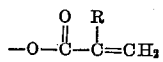

as defined above.

Taking styrene, for example, as representative of the ethylenically unsaturated monomer of the present invention, a new polymeric material can, for instance, be a polymerization product of styrene with a functional polymer that has the structure of a copolymer of ethylene with vinyl acrylate in which it is the vinyl group that has taken part in the copolymerization and the acrylate portion is present in unpolymerized form in the functional polymer, or a polymerization product of styrene with, for instance, a functional polymer having the structure of a copolymer of ethylene and vinyl acetate in which some or all of the acetoxy groups have been replaced by an acyl radical derived from acrylic or methacrylic acid.

The new polymeric materials of this invention can be produced in forms having widely differing properties, enabling materials to be obtained that are suitable for a variety of applications. The new materials are tough and strong, with a certain degree of flexibility, and are normally obtained in a clear and colorless form with a good surface gloss. Some members are true thermoplastic resins, but more usually the materials are thermosetting in principle. In the latter instance, however, materials can readily be obtained that are essentially cross-linked but that nonetheless become softened sufficiently on heating to enable them to be shaped, at least to a certain extent. Their stability on aging, particularly outdoors, is good, and in general they are substantially unaffected by, for example, water, organic solvents, alkalies and acids, even in some instances at elevated temperatures. The materials are particularly valuable in laminates, for example, in conjunction with fibrous fillers such as, e.g., glass, or some other reinforcing agent. They can also be employed, for instance, in surface coatings, or as potting or embedding resins.

The process of the invention is one for the production of a new polymeric material by polymerization of an ethylenically unsaturated monomer with a functional polymer as described above.

The present invention is not limited in the ethylenically unsaturated monomer employed. As will be obvious to those skilled in the art the general inventive concept is broadly applicable to all monomers copolymerizable with, e.g., acrylate systems. Thus, while styrene is the preferred monomer, it may be replaced with equivalent results, for example, in carrying out the ensuing Examples, by any copolymerizable monomer: including, for example, such other vinyl aromatics as alpha-methylstyrene, para-chlorostyrene, divinylbenzene, vinylnaphthalene, etc.; diolefins and the substituted derivatives thereof such as butadiene, isoprene, chloroprene, cyclohexadiene-1,3,etc.; nitriles such as acrylonitrile, methacrylonitrile, etc.; halides such as vinyl chloride, vinylidene chloride, allyl chloride, etc.; ethers such as vinyl ethyl ether, etc.; esters of unsaturated acids such as methyl acrylate, ethyl acrylate, methyl methacrylate, methyl crotonate, etc.; esters of unsaturated alcohols such as vinyl acetate, allyl acetate, diallyl phthalate, etc.; etc.

The other starting-material, the functional polymer, is fully described in copending application S.N. 246,355 filed Dec. 21, 1962, as has been stated, and full details are given there. However, in summary, the olefinic hydrocarbon that is one component of the functional polymer (a copolymer) can be, for instance, an alpha-olefin, such as ethylene, propylene, 1-butene, isobutene, or a higher homolog having either a straight or branched chain, for example 1-hexene or 2,2,4-trimethylpentene-1. The olefinic hydrocarbon component in other instances can be or can contain a cyclic olefin, such as cyclopentene or cyclohexene; or a compound having more than one olefinic bond, for example, butadiene, isoprene, or 1,5-hexadiene; or an aryl olefin, such as styrene. Ethylene is often the preferred olefin.

The functional polymer starting-material contains the ethylenically unsaturated acyloxy group

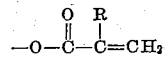

as defined above, derived from acrylic acid or from an alpha-substituted acrylic acid such as, for example, methacrylic acid, ethacrylic acid, butacrylic acid, etc.

Where the functional polymer starting-material is defined as one having the structure of a copolymer of an olefinic hydrocarbon with an ester in the way described above, the ethylenically unsaturated acid component of the ester is, of course, as described in the previous paragraph. The ethylenically unsaturated alcohol (normally aliphatic) from which the ester is derived can be for example vinyl alcohol, a substituted vinyl alcohol, allyl alcohol, methallyl alcohol or crotyl alcohol; it can also be a cyclic alcohol, for instance, 2-cyclohexene-1-ol.

The functional polymer starting-materials may, optionally, also contain acyloxy groups of the structure:

(1)

$$-O-\overset{O}{\underset{\|}{C}}-R'$$

or (2)

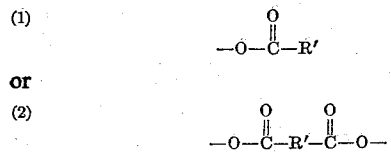

wherein R' is a hydrocarbon residue free of ethylenic and acetylenic unsaturation, generally containing from 1 to about 12 carbon atoms. Such acyloxy groups are derived from a saturated acid such as, for example, monobasic aliphatic acids of which acetic, butyric, caprylic and stearic acid are exemplary; monobasic aromatic acids of which benzoic acid is exemplary; dibasic aliphatic acids of which adipic and sebacic acids are exemplary; and dibasic aromatic acids of which phthalic and terephthalic acids are exemplary.

Moreover the functional polymer starting-material also may, optionally contain hydroxyl groups attached to the copolymer backbone. For example, the resin can have the structure of a copolymer as defined that is also derived from an ethylenically unsaturated aliphatic alcohol as a component monomer, for instance, vinyl alcohol or one of the other unsaturated alcohols referred to above.

Thus, for example, the final resin can have the structure of an ethylene-vinyl acrylate-vinyl alcohol copolymer.

The preferred functional polymer starting-materials are those where the olefinic hydrocarbon is a lower alpha-olefin, for example, ethylene or propylene, and where a comonomer is an ester of vinyl alcohol with acrylic acid or an alpha-substituted homolog, such as methacrylic acid. Where the resin contains acyloxy groups (1)

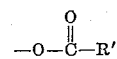

or (2)

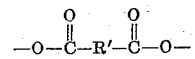

as defined above, derived from a saturated acid, this is preferably a lower aliphatic acid, such as acetic acid, etc.

Specific instances of the functional polymer starting-materials are those having the structures of: a copolymer of ethylene and vinyl acrylate; a copolymer of ethylene, vinyl alcohol and vinyl acrylate; a copolymer of ethylene, vinyl acetate and vinyl acrylate; a copolymer of ethylene, propylene and vinyl methacrylate; a copolymer of propylene, vinyl alcohol, vinyl butyrate and vinyl methacrylate; and a copolymer of ethylene, allyl alcohol, vinyl alcohol and vinyl ethacrylate. It will be understood that as has been explained, it is the vinyl or allyl group in each instance that has taken part in the copolymerization.

In general, in the functional polymer starting-materials, the proportion that is derived from the olefinic hydrocarbon and the number of acyloxy groups

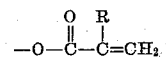

and of the other optional groups can vary over a wide range. By way of example, the polymer can be derived for instance from about 25 molar percent to about 99 molar percent of the olefinic hydrocarbon, although in certain instances there can be a smaller proportion than this lower limit. The preferred polymers are those derived from not more than 97 molar percent of the olefinic hydrocarbon, particularly those where the molar percentage is within the range 50 to 95, for example, 60, 70, 80 or 90.

The molar percentage of ethylenically unsaturated ester units in the copolymer is in general not less than about 0.1, and is normally within a range of about from 1 to 20. Very useful functional polymers are those where the molar percentage of ethylenically unsaturated ester units is within a range of about from 1 to 10, for example 2.5, 5.0 or 7.5. In general the lower the molar percent of the olefinic hydrocarbon (such as ethylene) and the larger the content of unsaturated acyloxy groups the greater the possibilities are of cross-linking taking place when the functional polymer starting-material is polymerized with the ethylenically unsaturated monomer in making the final polymeric material, and of course the more cross-linking that occurs the more thermoset the final product will be.

In the new polymeric materials of this invention the proportion of ethylenically unsaturated monomer that is polymerized with the functional polymer starting-material can vary over a wide range, for example, the percentage by weight of the ethylenic monomer can be between 1 and 99%, for instance 10 to 95%, of the final polymeric material. Again, the properties of the final product partly depend on the percentage of the ethylenically unsaturated monomer, as well, of course, as upon the constitution of the functional polymer starting-material as has been explained in the previous paragraph. Where the percentage of ethylenically unsaturated monomer is low, perhaps from 10 to 50%, for instance 15 to 40%, the polymeric materials tend to be very flexible and even to possess rubbery properties in some instances. Where, however, a higher percentage of the ethylenically unsaturated monomer is present, such as from 50 to 97%, the polymeric materials are relatively rigid, and usually become more rigid as the percentage of ethylenically unsaturated monomer is increased. Useful materials that are rigid can for instance be obtained with a content of ethylenically unsaturated monomer of 60 to 95%, for example, 70, 80 or 90%. As has been explained in the previous paragraph, the degree to which the ethylenically unsaturated monomer leads to cross-linking in the final polymeric material depends to a substantial extent on the number of ethylenically unsaturated acyloxy groups present in the functional polymer starting-material.

Specific examples of the new polymeric materials of this invention are: styrene polymerized with a functional polymer having the structure of an ethylene-vinyl acrylate copolymer; styrene polymerized with a functional polymer having the structure of an ethylene-vinyl alcohol-vinyl acrylate-vinyl methacrylate copolymer; styrene polymerized with a functional polymer having the structure of an ethylene-propylene-vinyl butyrate-vinyl methacrylate copolymer; styrene and alpha-methylstyrene polymerized with a functional polymer having the structure of a propylene-vinyl alcohol-vinyl methacrylate copolymer; and styrene para-chlorostyrene and para-divinylbenzene polymerized with a functional polymer having the structure of an ethylene-allyl alcohol-vinyl alcohol-vinyl ethacrylate copolymer.

The polymerization of the ethylenically unsaturated monomer and the functional polymer in the process of this invention is generally brought about in the absence of a diluent, although in certain circumstances an inert organic solvent can be present, or for instance the process can be operated with the reactants in aqueous suspension or emulsion.

The polymerization can be initiated by heat alone, but in general it is preferable to use a conventional chemical polymerization initiator. Suitable chemical initiators are usually those capable of giving rise to free radicals, for instance, organic peroxides, organic hydroperoxides, aliphatic azobisnitriles and redox catalysts. The quantity of initiator employed can vary over a wide range, for instance, from 0.1 to 10% of the combined weight of the reactants, particularly for instance from 0.5 to 2%.

Good results are obtained when a blend of the ethylenically unsaturated monomer and the functional polymer (which in most instances is a mutual solution) is treated with an organic peroxide, for instance, t-butyl peroxide, dicumyl peroxide, or benzoyl peroxide, and the mixture is heated. A suitable temperature is generally one within a range of about 15° to about 200° C., for instance 20° to 160° C., such as 50° C. to about 100° C., the optimum in any particular instance of the process depending on a number of factors including the type and quantity of initiator employed. Thus, with about 1% by weight of an aromatic peroxide, for example dicumyl peroxide, as initiator, excellent results are obtained at temperatures in the range 100°–160° C. With 1% of an aliphatic peroxide, for example, caprylyl peroxide, excellent results are obtained at somewhat lower temperatures, for instance, in the range 50°–100° C., while even lower temperatures can be employed with a redox catalyst, for example, a hydroperoxide with a metal soap, such as cyclohexanone peroxide and cobalt naphthenate; or an acyl peroxide with a tertiary amine, such as benzoyl peroxide and dimethylaniline.

The polymeric materials of the present invention have numerous uses, as has been explained earlier. They can be employed, for instance, in surface coatings, such as enamels, by applying a mixture comprising the ethylenically unsaturated monomer and the functional polymer to a surface, and then stoving. The materials that are thermoplastic can be used to manufacture molded articles, for example, by injection molding, or by casting a mixture comprising the monomer and the functional polymer starting-material and polymerizing in the mold. Various substances, for example, pigments opacifying agents, plasticizers or reinforcing fillers, can be incorporated in the materials to modify their physical or chemical proporties as required. A reinforcing filler can, for instance, consist of paper or fibers or fabrics made from glass, asbestos, cellulose, modified cellulose, or from synthetic materials, such as polyamides or polyesters, or, where the processing temperature is not too high, polyacrylonitrile, polyvinyl alcohol, or polyolefins. Particularly valuable are glass fibers, for example, in the form of a chopped strand mat or a needled mat. Products reinforced in this way, for example, in the form of sheets, are extremely valuable. Excellent results are obtained when the reinforced material contains for instance from 15 to 35% by weight of glass fibers, for example about 25%.

The invention is illustrated by the following examples.

*Example I*

This example describes the production of glass fiber reinforced laminates from polymeric materials obtained by polymerization of styrene and a functional polymer having the structure of a copolymer of 55% by weight of ethylene, 34% by weight of vinyl acetate and 11% by weight of vinyl methacrylate; in the functional polymer starting-material it is the vinyl groups of the ester that are polymerized, so that the functional polymer contains unpolymerized methacrylyl groups.

A mole comprising two cellophane-lined glass plates held about 0.1 inch apart by formers enclosing a space 6 inches square is employed. In the production of a laminate, the upper plate is removed and two plies of a glass fiber mat, each having a weight of 1.5 ounces per square foot, are placed in the space enclosed by the formers. A syrup prepared by mixing 90 parts by weight of styrene monomer with 10 parts by weight of the functional polymer and containing 1% by weight of caprylyl peroxide and 0.5% by weight of dicumyl peroxide is then poured on top of the fiber mat. The weight of syrup is three times that of the glass fiber. After thorough impregnation of the fiber mat with the syrup, the upper glass plate is replaced and suitably clamped to the lower. The mold is then heated for 1 hour at about 50° C., and finally for 10 minutes at about 130° C. When cool, the mold is opened and the sheet of reinforced material is removed. (Laminate A.)

A second sheet (Laminate B) is produced similarly from a syrup of 95 parts by weight of styrene and 5 parts by weight of the functional polymer, and a third sheet (Laminate C) from a commercial polyester resin (based on a modified maleic anhydride-glycol polyester with styrene as the cross-linking monomer).

Conventional test methods are employed in determining physical properties. The method of determining Flexural Strength and the Deflection at Break is basically that of ASTM Standard D790–59T using specimens having dimensions of 3 inches by 0.250 inch, and a cross head speed of 0.05 inch per minute.

For modulus measurements, the specimens employed are cut from sheet to the conventional dumb-bell shape (see ASTM standard D638–58T) but are smaller in size than the standard specimen, having a middle parallel section $1.0 \pm 0.03$ inch in length and $0.250 \pm 0.005$ inch in width. The end sections are 0.5 inch in width, and the overall length of the specimens is 5 inches. The specimens are tested at two cross head speeds, 0.05 inch and 1 inch per minute, on a TT–B Instrom machine.

Tests are also carried out on specimens that have been immersed in water for 7 days at room temperature. The results are given in the table below:

| | | Flexural Strength (p.s.i.) | Deflection at Break (Inch) | Modulus (10⁵ p.s.i.) |
|---|---|---|---|---|
| Laminate A | Originals | 26,370 | 0.192 | 9.5 |
| Laminate B | | 25,890 | 0.238 | 9.2 |
| Laminate C | | 20,220 | 0.152 | 9.2 |
| Laminate A | After immersion in water | 18,790 | 0.173 | 8.4 |
| Laminate B | | 20,030 | 0.200 | 8.2 |
| Laminate C | | 17,630 | 0.150 | 8.1 |

The results show that the polymeric materials of this invention (Laminates A and B) possess excellent strength properties, even after the immersion in water, and they are in fact superior to the commercially accepted polyester resin (Laminate C).

Example II

This example describes the production of transparent, colorless polymeric materials of the invention, derived from styrene and a functional polymer having the structure of a copolymer obtained by the hydrolysis and subsequent partial re-esterification with methacrylic acid of an ethylene-vinyl acetate copolymer, and containing ethylene, vinyl alcohol and vinyl methacrylate units in the proportions by weight of 70:14:16 respectively.

(a) 1.0 gram of dicumyl peroxide is added to a solution of 50 grams of the functional polymer in 50 grams of styrene monomer, and the mixture is heated at 130°–150° C. for 10 minutes between steel plates held 0.020 inch apart. The polymeric material is thus obtained in the form of a sheet, which is colorless, transparent and flexible. Its tensile strength, determined using a specimen and procedure as described for the modulus measurements of Example I, is about 2700 pounds per square inch.

(b) 1.0 gram of dicumyl peroxide is added to a solution of 33 grams of the functional polymer in 67 grams of styrene monomer, and the mixture is formed into a sheet as described in Example II(a). The material has a tensile strength of about 4000 pounds per square inch, and is more rigid than the previous product.

(c) 1.0 gram of dicumyl peroxide is added to a solution of 10 grams of the functional polymer in 90 grams of styrene monomer, and the mixture is formed into a sheet as described in Example II(a). The material is even more rigid, and has a tensile strength of about 5110 pounds per square inch.

(d) Similar products are also obtained from each of the above blends of the functional polymer and styrene, using 1.0 gram of caprylyl peroxide as initiator and a curing temperature of 70° C.

Example III

This example describes the preparation of transparent, colorless materials from styrene and a functional polymer having the structure of a copolymer obtained by the hydrolysis and subsequent re-esterification with methacrylic acid and acetic anhydride of an ethylene-vinyl acetate copolymer; the functional polymer contains ethylene, vinyl acetate and vinyl methacrylate units in the proportions by weight of 70:19:11, respectively.

(a) 1.0 gram of dicumyl peroxide is added to a solution of 25 grams of the functional polymer in 75 grams of styrene monomer, and the mixture is formed into a sheet of interpolymer as described in Example II(a). The colorless product has a tensile strength of about 5411 pounds per square inch.

(b) A product obtained similarly from 12.5 grams of the functional polymer and 87.5 grams of styrene monomer with 1.0 gram of dicumyl peroxide has a tensile strength of about 4784 pounds per square inch.

(c) Products in the form of a plain sheet and of a sheet reinforced with glass fibers are also obtained from each of the preceding two blends of styrene and functional polymer, using 1.0 gram of caprylyl peroxide as initiator and a curing temperature of 70° C.

Example IV

This example describes the preparation of transparent, colorless polymeric materials from styrene and a functional polymer having the structure of a copolymer obtained by the hydrolysis and partial re-esterification with acrylic acid of an ethylene-vinyl acetate copolymer; the copolymer contains ethylene, vinyl alcohol and vinyl acrylate units in the proportions by weight of 70:15:15, respectively.

(a) 1.0 gram of dicumyl peroxide is added to a solution of 33 grams of the functional polymer in 67 grams of styrene monomer, and the mixture is formed into a sheet as described in Example II(a). The product has a tensile strength of about 3550 pounds per square inch.

(b) a sheet obtained similarly from 25 grams of the functional polymer and 75 grams of styrene monomer, using 1.0 gram of dicumyl peroxide as polymerization initiator, has a tensile strength of 4520 pounds per square inch.

Example V

This example describes the production of transparent, colorless polymeric materials of the invention, derived from styrene and a functional polymer having the structure of a copolymer containing ethylene, vinyl acetate and vinyl methacrylate units in the proportions by weight of 83:11:6, respectively.

(a) 1.0 gram of dicumy peroxide is added to a solution of 15 grams of the functional polymer in 85 grams of styrene monomer, and the mixture is formed into a sheet as described in Example II(a). The material is transparent and colorless, and its tensile strength, determined using a specimen and procedure as described for the modulus measurements of Example I, but using a crosshead speed of 0.2 inch per minute, is 6220 lbs. per square inch at yield. The sample does not break at this cross-lead speed, but does break at about 6570 pounds per square inch using a speed of 10 inches per minute.

(b) 1.0 gram of dicumyl peroxide is added to a solution of 10 grams of the functional polymer in 90 grams of styrene monomer, and the mixture is formed into a sheet in the same way. The material is transparent and colorless, and is rather more flexible than the product of Example II(c).

It is obvious that many variations may be made in the products and processes set forth above without departing from the spirit and scope of this invention.

What is claimed is:

1. A polymeric material consisting essentially of in copolymerized form (a) from 50 to 97 weight percent of an ethylenically unsaturated monomer and (b) correspondingly, from 50 to 3 weight percent of a functional interpolymer consisting of a plurality of recurring structural groups corresponding to the following structural formulae (1) 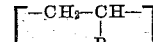

(2) 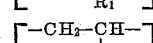

(3) 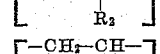

(4) 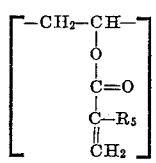

wherein Formula 1 comprises 50 to 95 molar percent, Formula 2 comprises zero to 49 molar percent; Formula 3 comprises zero to 49 molar percent and Formula 4 comprises 1.0 to 20 molar percent, the total of formulae 1, 2, 3 and 4 being 100 molar percent; and wherein $R_1$ is selected from the group consisting of hydrogen, phenyl and alkyls of form 1 to 2 carbon atoms; $R_2$ is selected from the group consisting of hydroxyl and hydroxy methylene; $R_3$ is selected from the group consisting of

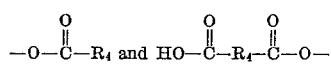

wherein $R_4$ is a hydrocarbon residue of from 1 to 12 carbon atoms and $R_5$ is selected from the group consisting of hydrogen and alkyls of from 1 to 4 carbon atoms.

2. A polymeric material as in claim 1 wherein the ethylenically unsaturated monomer is styrene.

3. A polymeric material as in claim 1 wherein the functional interpolymer is an interpolymer of ethylene, vinyl alcohol and vinyl acrylate.

4. A polymeric material as in claim 3 wherein the ethylenically unsaturated monomer is styrene.

5. A polymeric material as in claim 1 wherein the functional interpolymer is an interpolymer of ethylene, vinyl alcohol and vinyl methacrylate.

6. A polymeric material as in claim 5 wherein the ethylenically unsaturated monomer is styrene.

7. A polymeric material as in claim 1 wherein the functional interpolymer is an interpolymer of ethylene, vinyl acetate and vinyl methacrylate.

8. A polymeric material as in claim 7 wherein the ethylenically unsaturated monomer is styrene.

9. A laminate comprising a reinforcing filler and a polymeric material as in claim 1.

10. A laminate as in claim 9 wherein the reinforcing filler is glass fiber.

References Cited

UNITED STATES PATENTS

| | | | |
|---|---|---|---|
| 2,399,653 | 5/1946 | Roland | 260—87.3 |
| 2,441,515 | 5/1948 | Snyder | 260—80.5 |
| 2,725,372 | 11/1955 | Minsk | 260—91.3 |
| 2,830,032 | 4/1958 | Siebel | 260—885 |
| 2,958,673 | 11/1960 | Stamford | 260—885 |
| 3,153,022 | 10/1964 | Calkins et al. | 260—80.5 |

MORRIS LIEBMAN, *Primary Examiner.*

L. T. JACOBS, *Assistant Examiner.*